United States Patent
Ho et al.

(10) Patent No.: US 7,631,063 B1
(45) Date of Patent: Dec. 8, 2009

(54) OPERATING AND MANAGING NETWORK APPLICATION ON A CONSUMER NETWORK DEVICE USING A CONTROL CONSOLE INCORPORATED INTO THE CONSUMER NETWORK DEVICE

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 216 days.

(21) Appl. No.: 11/953,089

(22) Filed: Dec. 10, 2007

Related U.S. Application Data

(62) Division of application No. 11/123,681, filed on May 6, 2005, now abandoned.

(51) Int. Cl.
*G06F 15/16* (2006.01)
*G06F 15/173* (2006.01)
*G06F 15/177* (2006.01)

(52) U.S. Cl. ......... 709/223; 709/228; 340/531; 358/444

(58) Field of Classification Search ......... 709/217–228; 340/531; 358/444
See application file for complete search history.

(56) References Cited

U.S. PATENT DOCUMENTS

| | | | |
|---|---|---|---|
| 4,644,100 A * | 2/1987 | Brenner et al. | 178/18.04 |
| 6,973,663 B1 * | 12/2005 | Brown et al. | 725/39 |
| 7,030,752 B2 * | 4/2006 | Tyroler | 340/531 |
| 7,046,778 B2 * | 5/2006 | Martin et al. | 379/201.01 |
| 7,069,291 B2 * | 6/2006 | Graves et al. | 709/201 |
| 7,216,350 B2 * | 5/2007 | Martin et al. | 719/315 |
| 2004/0123149 A1 * | 6/2004 | Tyroler | 713/201 |
| 2004/0133689 A1 * | 7/2004 | Vasisht | 709/228 |
| 2006/0253562 A1 * | 11/2006 | Ho et al. | 709/223 |
| 2007/0076650 A1 * | 4/2007 | Manjeshwar et al. | 370/328 |

* cited by examiner

*Primary Examiner*—Haresh N Patel
(74) *Attorney, Agent, or Firm*—North Shore Patents, P.C.; Michele Liu Baillie

(57) ABSTRACT

Embodiments of the present invention include apparatuses for a console controller in a network device. In one embodiment, the present invention includes a console controller, a display module and an input module in a network device so that a user can view, enter, or program network or network device settings at the network device. In another embodiment, the present invention can be programmed to include automated out-of-the-box initial setup procedures to guide a user in the setup, management and operation of a network devices such a DSL/Cable modems or routers, VoIP routers, wireless access points or gateways with or without remote or onsite technical support or update services.

18 Claims, 14 Drawing Sheets

OPERATING AND MANAGING NETWORK APPLICATION ON A CONSUMER NETWORK DEVICE USING A CONTROL CONSOLE INCORPORATED INTO THE CONSUMER NETWORK DEVICE

CROSS-REFERENCE TO RELATED APPLICATIONS

The application is a divisional of U.S. patent application, entitled "Operating and Managing Network Application on a Consumer Network Device Using a Control Console Incorporated into the Consumer Network Device", Ser. No. 11/123,681, now abandoned, filed on May 6, 2005.

BACKGROUND OF THE INVENTION

1. Field

This invention relates to the field of data and voice communications, and in particular, an apparatus to operate and manage a consumer network device.

2. Related Art

Since the commercialization of the Internet in the 1990s, manufacturers have introduced consumer network products and services at a breathtaking pace. From more technology driven products like telephone modems, ADSL/Cable modems, Ethernet hubs/switches, consumer broadband gateways and routers, and wireless access points, manufactures are moving rapidly to integrate networking technologies into more traditional consumer products such as IP telephony adaptors, network audio servers, network gaming consoles, and network security devices. In the foreseeable future, there will be many new consumer network products and services, to improve the usefulness of current consumer technology products and services, or to enrich further the contemporary life styles. These emerging products and services create a new landscape for communications, productivity, and entertainment for consumers. Yet at the same time the products and services employ more and complex technologies than most consumers can comprehend. The proliferation of these consumer network devices creates a new set of problems because most consumers do not possess the necessary technical knowledge to operate and to manage the products.

These consumer network devices typically use Internet technologies. Today these devices require a connection to a personal computer for initial set-up, periodic operation and management, and troubleshooting. The difficulties, complexities and issues that arise due to the current state of the art for setting up, managing and operating such network devices are best illustrated by examples.

In one scenario, a user subscribes to a DSL broadband data service and has a DSL modem. Recently the consumer bought a second personal computer. In order to have Internet access to both personal computers, the consumer learns he can connect both personal computers to a broadband gateway. He buys a consumer broadband gateway. During the initial set-up of the consumer broadband gateway, the default IP address of consumer broadband gateway is factory set at 192.168.1.101 and the subnet mask at 255.255.255.0. His two personal computers however, have IP addresses of 10.122.11.123 and 10.122.11.124, with a subnet mask of 255.255.240.0. The consumer connects the WAN port of the consumer broadband gateway to the DSL modem, and both personal computers to the LAN ports of the consumer broadband gateway. Following the instruction manual of the consumer broadband gateway, the consumer launches the Web browser, at one of his personal computers, to access the URL "http://192.168.1.101/index.html" which would allow the consumer to access the consumer broadband gateway. Due to the incompatible settings, the Web browser returns an error message indicating the failure to access the URL. The consumer checks the consumer broadband gateway and sees several blinking LED's. According to the manual, the consumer broadband gateway indicates normal LAN port activities. However, the consumer becomes frustrated as he cannot get further information which step in the initial set-up he has a mistake. After a few hours of frustration, the consumer decides to return the consumer broadband gateway.

In another scenario, the consumer bought a wireless network access point and connected it to his consumer network at home. Fortunately, the consumer understood enough about his home network and was able to set-up the wireless network access point. However, the new wireless network access point includes a DHCP server and was interfering with the DHCP server running in an existing consumer broadband gateway in his consumer network. This interaction caused the network to malfunction after a couple of days. The consumer's personal computer was not able to reach the wireless network access point, the consumer broadband gateway, or other consumer network devices in his consumer network. The consumer checked the wireless network access point and the consumer broadband gateway. The LEDs on the two devices indicate normal operation. After numerous calls to the customer support of the manufacturer of the wireless network access point, the manufacturer of the consumer broadband gateway, the manufacturer of the personal computer and the broadband service provider, the consumer suffers frustration as the problem remained unsolved. The consumer eventually returned the wireless network access point.

In another scenario, the consumer subscribed to an IP telephone service and brought home a new IP telephony adaptor. She connected the IP telephony adaptor to her consumer network, and connected her home phone to the telephone jack of the IP telephony adaptor. She faced the same problem as the consumer in the above scenario that the factory preset IP address and subnet mask were incompatible to that of her consumer network. After great frustration and many service calls, the problem was eventually resolved by an onsite service person, a costly experience for the consumer as well as the IP telephone service provider.

The foregoing examples illustrate a need for a user-friendly solution for a consumer to set up, operate and manage consumer network devices that will reduce the amount of time, money and frustration to both the consumer and the manufacturer, service provider or reseller.

BRIEF SUMMARY OF THE INVENTION

Embodiments of the present invention include method and apparatuses for a Console Controller.

In one embodiment, a control console comprising a display module, an input module and console controller is incorporated into a network device such as, but not limited to, a DSL/Cable router, a switch, a hub, a DSL/Cable modem, Voice over Internet Protocol (VoIP) router, wireless access point, wireless router or residential gateway to facilitate the display, input, programming and configuration of network settings of said network device without the use of a separate device or computer. The control console provides a means for retrieving data about and entering data for the network device on the actual network device. The control console communicates with the network application on the network device over an operation and management interface. The console controller can greatly reduce the difficulty associated with current state of the art set up, management and operation of the network device.

In one embodiment, the control console can have one or more lines of graphical information display with one or more single purpose or multi purpose buttons, dials or touch pads.

In one embodiment, the control console can have audio notification or response capabilities. Such audio notification or response can include, but is not limited to, alarms for when network functionality or status changes or sounds played to confirm button operation or successful input of information.

Additional embodiments will be evident from the following detailed description and accompanying drawings, which provide a better understanding of the nature and advantages of the present invention.

DETAILED DESCRIPTION OF THE INVENTION

Described herein are apparatuses for a Control Console for a network device. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
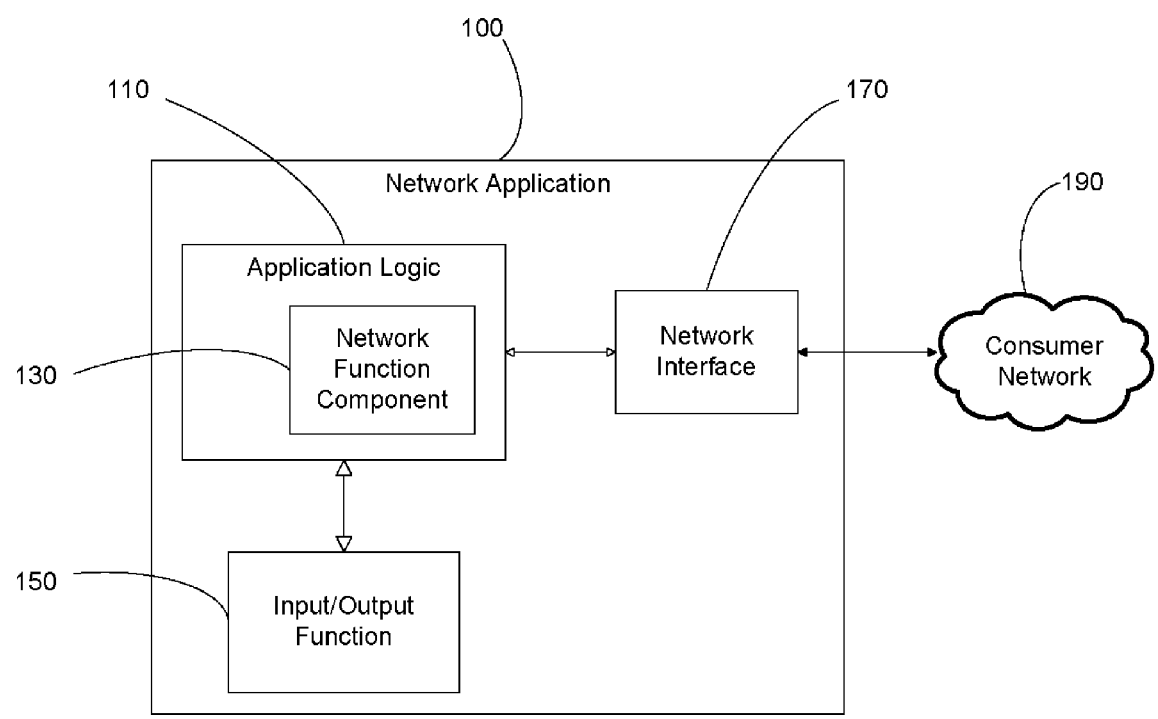
FIG. 1 is a block diagram illustrating a Network Application and Network Function Component according to one embodiment of the present invention.

FIG. 1 is a diagram illustrating a conventional Network Application. Network Application 100 includes an Application Logic 110 and a Network Interface 170.

In one embodiment, Network Application 100 also includes an Input/Output Function 150, such as a speaker and a microphone, or other special purpose sensors or drivers. Application Logic 110 communicates with one or more network devices connected to Consumer Network 190 via Network Interface 170.

In one embodiment, Consumer Network 190 is an IP network over Ethernet technology.

In one embodiment, Consumer Network 190 is an IP network over Wi-Fi technology.

In one embodiment, Consumer Network 190 is an IP network over a plurality of technologies.

Application Logic 110 includes a plurality of Network Function Component 130. A Network Function Component 130 relates to the interaction between Application Logic 110 and Network Interface 170.

In one embodiment, a Network Function Component 130 is an IP address, a subnet mask, a remote server address, a default gateway address, an option for static or dynamic IP address allocation, or the SSID of a wireless network access point.

In one embodiment, a Network Function Component 130 is an indication of the connectivity to a default gateway, or an indication of the quality of a communication link such as an Ethernet connection.

In one embodiment, a Network Function Component 130 is the transmission rate at Network Interface 170, the number of dropped packets in a communication session, or an indication of the quality of a wireless link.

In one embodiment, a Network Function Component 130 is a test of a network capability of Application Logic 110. For example, a Network Function Component 130 is a test of the connectivity of Network Interface 170 and Consumer Network 190, a test of the connectivity towards the default gateway of Consumer Network 190, a test of connectivity towards a remote server, the request to renew an IP address from a DHCP server application, or a test of the functionality of a firewall.

A consumer network device runs a number of applications, including one or more network applications. In one embodiment, a network application is a DHCP server application.

In one embodiment, a network application is a network access point application, such as a wireless network access point application.

In one embodiment, a network application is an IP phone application.

In one embodiment, a network application is a routing application, such as a DSL routing application, or a cable modem routing application.

In one embodiment, a network application is a firewall application.

In one embodiment, a network application is a network multi-media application, such as a network music application, a network photo album application, or a network video application.

In one embodiment, a network application is a network security application, such as a network surveillance application, a baby room monitoring application, or a network alarm application.

In one embodiment, a network application is a network remote control application, such as a home appliance remote control application, a swimming pool remote control application, or a home landscape remote irrigation application.

Figure 2:
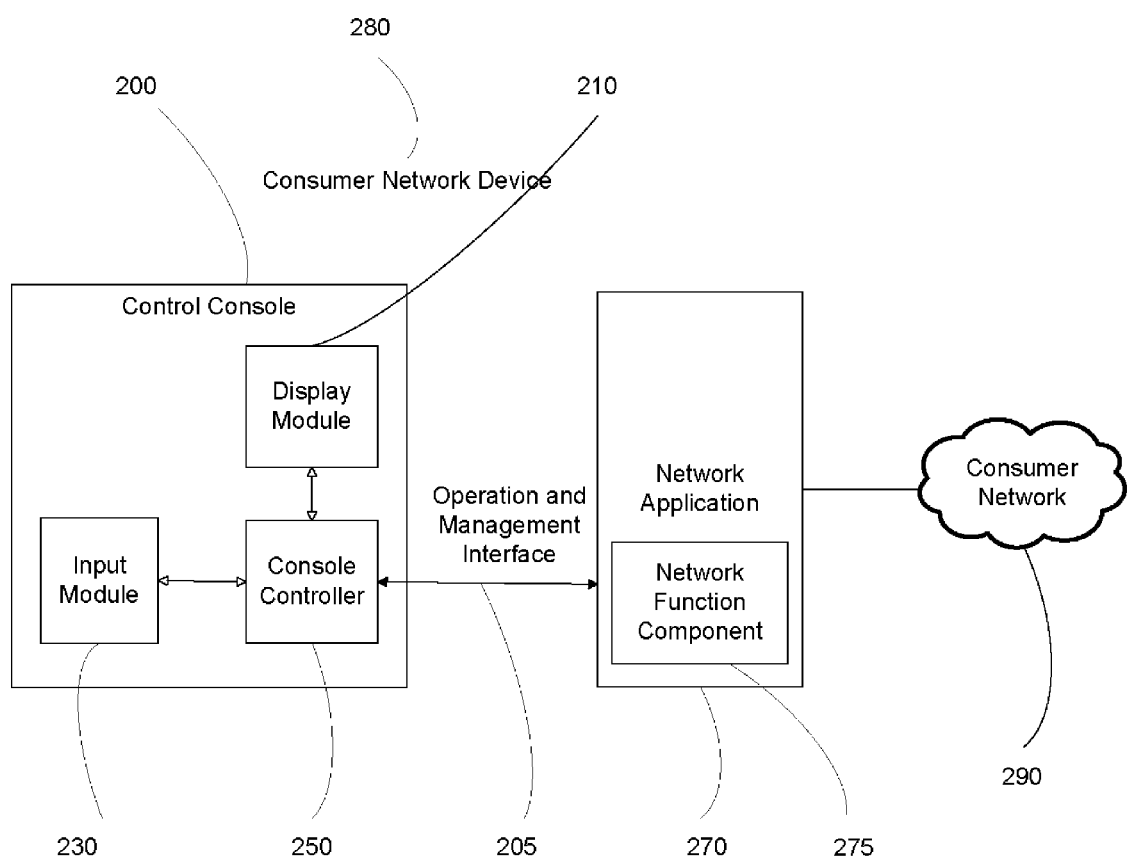
FIG. 2 is a block diagram illustrating a Consumer Network Device with Control Console according to one embodiment of the present invention.

FIG. 2 is a diagram illustrating a Control Console. Control Console 200 is a part of a Consumer Network Device 280. Control Console 200 connects to Network Application 270 over Operation and Management Interface 205. Operation and Management Interface 205 is a programming interface. Control Console 200 operates and manages a plurality of Network Function Component 275 over Operation and Management Interface 205.

Control Console 200 may include Display Module 210, Input Module 230, and Console Controller 250.

Input Module 230 allows a user to provide input to Console Controller 250. In one embodiment, Input Module 230 includes a plurality of keys.

In one embodiment, Input Module 230 includes a plurality of dials.

In one embodiment, Input Module 230 includes a voice recognition module.

Display Module 210 displays information about Network Application 270. In one embodiment, Display Module 210 includes an alphanumeric display panel.

In one embodiment, Display Module 210 includes a graphic display.

In one embodiment, Display Module 210 includes a speaker.

Console Controller 250 receives user inputs from Input Module 230, communicates with Network Application 270 via the operation and management interface 205, determines the content to display and sends the content to Display Module 210 for display.

In one embodiment, the user input is to obtain the status information for a Network Function Component 275 of Network Application 270.

In one embodiment, Console Controller 250 requests the status information of a Network Function Component 275 from Network Application 270, and receives the status information from Network Application 270. Console Controller 250 sends the status information to Display Module 210.

In one embodiment, the user input is to set the value of a Network Function Component 275 of Network Application 270, Console Controller 250 sends the identity and the value of a Network Function Component 275 to Network Application 270, receives the result from Network Application 270, and sends the result to Display Module 210.

In one embodiment, the user input is to test a Network Function Component 275 of Network Application 270, Console Controller 250 requests Network Application 270 to test a Network Function Component 275, receives the test result from Network Application 270, and sends the information to Display Module 210.

Input Module and Display Module

Figure 3:
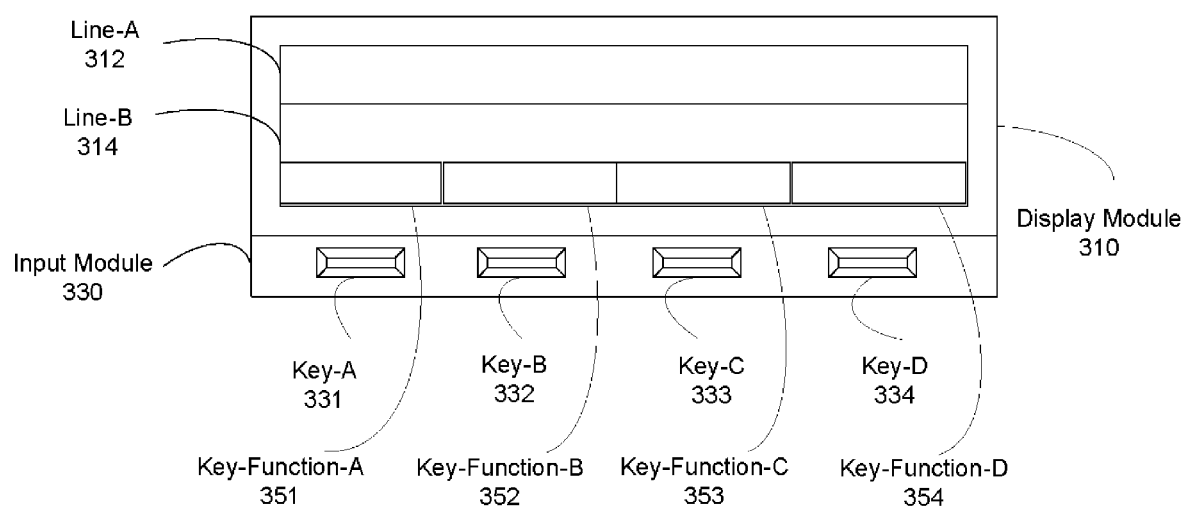
FIG. 3 is a representation of an Input Module and Display Module according to one embodiment of the present invention.

FIG. 3 illustrates an embodiment of Input Module 330 and Display Module 310. Input Module 330 includes four input keys, Key-A 331, Key-B 332, Key-C 333, and Key-D 334. A user presses the input keys at Input Module 330 to provide input to Console Controller 250.

Display Module 310 is an alphanumeric display panel with three lines of display. The first line is Line-A 312. The second line is Line-B 314. The third line includes four parts. The first part Key-Function-A 351 is located directly above Key-A 331. The second part Key-Function-B 352 is located directly above Key-B 332. The third part Key-Function-C 353 is located directly above Key-C 333. The fourth part Key-Function-D 354 is located directly above Key-D 334.

In one embodiment, Line-A 312 displays a name. For example, Line-A 312 displays "MAIN MENU".

In one embodiment, Line-B 314 displays a name, for example, "TEST MENU". In another embodiment, Line-B 314 displays "IP ADDRESS".

In one embodiment, Line-B 314 displays "172.168.66.62".

In one embodiment, Line-B 314 displays "255.255.240.0".

In one embodiment, Line-B 314 displays "rc: 12 kbps tx: 15 kbps dp pkt: 0".

In one embodiment, Line-B 314 displays "link quality is good, signal strength at 75%".

In one embodiment, Line-B 314 displays "DEFAULT GATEWAY TEST".

In one embodiment, Line-B 314 displays "NETWORK CONNECTION TEST".

In one embodiment, Line-B 314 displays "normal, round trip latency is 159 ms".

In one embodiment, Key-Function-A 351 displays the name of the function for Key-A 331. Key-Function-B 352 displays the name of the function for Key-B 332. Key-Function-C 353 displays the name of the function for Key-C 333. Key-Function-D 354 displays the name of the function for Key-D 334.

In one embodiment, Key-Function-A 351 displays "CHANGE", Key-Function-B 352 displays "LOCATE", Key-Function-C 353 displays "EXIT", and Key-Function-D 354 displays "SAVE".

Console Controller State Machine

Figure 4:
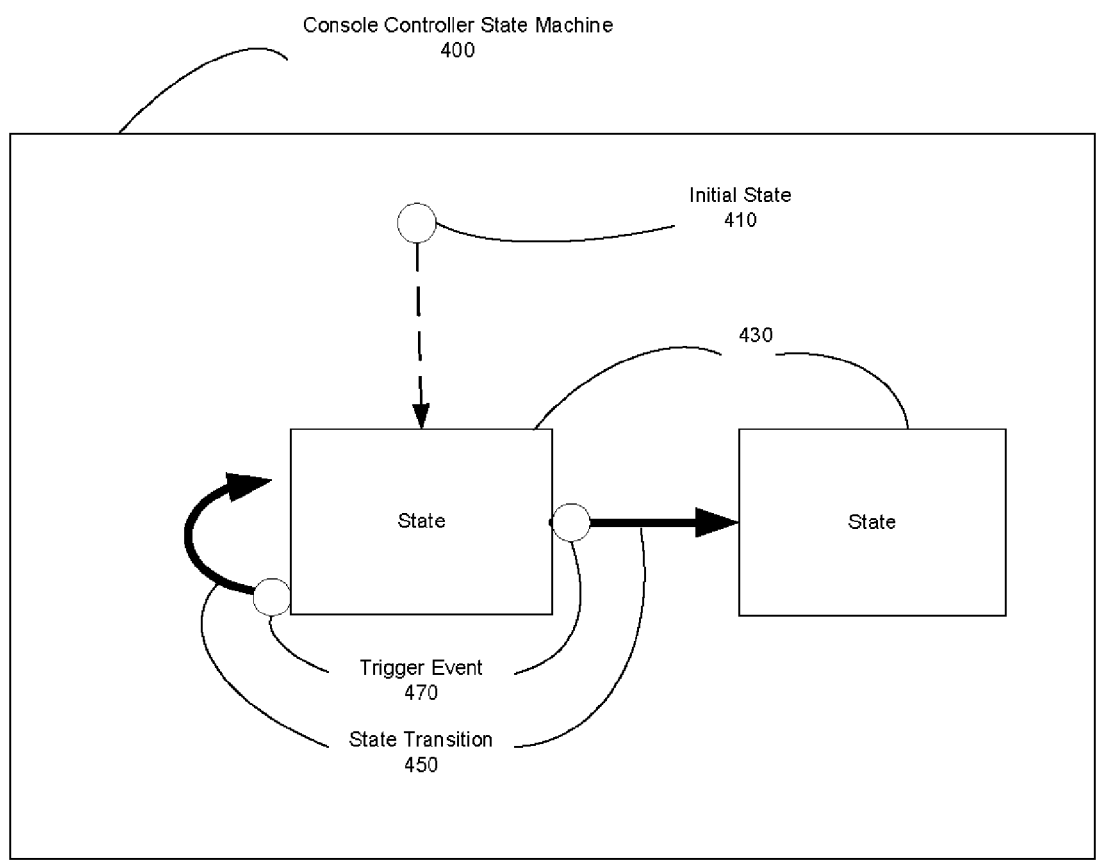
FIG. 4 is a block diagram illustrating a Console Controller State Machine according to one embodiment of the present invention.

FIG. 4 illustrates a Console Controller State Machine. Console Controller State Machine 400 is a state machine. The Console Controller 250 includes a plurality of Console Controller State Machine 400. Console Controller State Machine 400 has zero or more state variables. Console Controller State Machine 400 has one Initial State 410, a plurality of State 430, a plurality of State Transition 450, and a plurality of Trigger Event 470. Console Controller 250 starts a Console Controller State Machine 400 at the Initial State 410. Console Controller State Machine 400 enters a State 430 automatically. A user presses one of the four input keys, Key-A 331, Key-B 332, Key-C 333, or Key-D 334 at Input Module 330 to provide input to Console Controller 250. Console Controller State Machine 400 processes the input from Input Module 330, determines that a Trigger Event 470 has occurred and triggers a State Transition 450. A State Transition 450 leaves a State 430, enters a different State 430, or enters the same State 430. During a State Transition 450, Console Controller State Machine 400 takes zero or more actions. Each action acts on one or more state variables. Upon entering a State 430, Console Controller State Machine 400 takes zero or more actions.

In one embodiment, an action acts on zero or more state variables. In another embodiment, an action invokes communications to Network Application 270.

In one embodiment, an action invokes a command to Display Module 310.

In one embodiment, Console Controller State Machine 400 determines that the input from Input Module 330 does not correspond to a Trigger Event 470 and ignores the input from Input Module 330.

Main Menu State Machine

Figure 5:
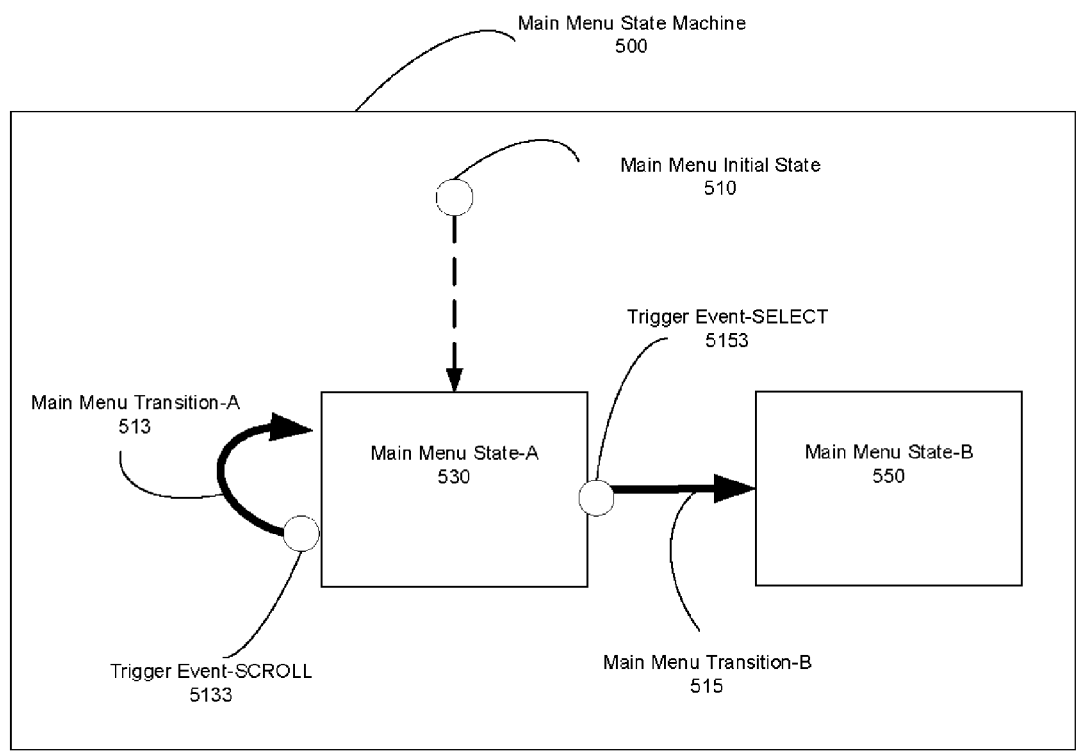
FIG. 5 is a block diagram illustrating a Main Menu State Machine according to one embodiment of the present invention.

FIG. 5 illustrates a Main Menu State Machine. Main Menu State Machine 500 is a Console Controller State Machine 400. Main Menu Machine 500 includes a Main_Menu_Line_Item_Table. Main_Menu_Line_Item_Table includes a plurality of Main_Menu_Line_Item.

In one embodiment, the Console Controller 250 includes a Main Menu State Machine.

Figure 6:
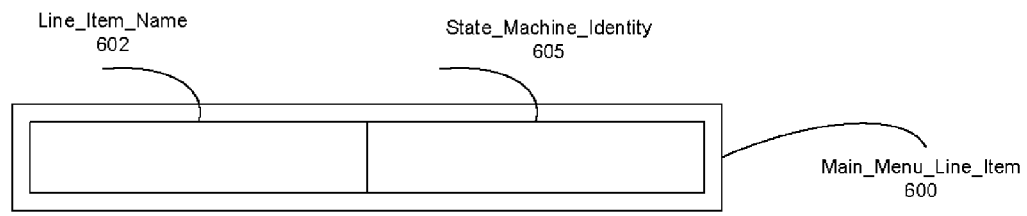
FIG. 6 is a representation of a Main_Menu_Line_Item according to one embodiment of the present invention.

FIG. 6 illustrates a Main_Menu_Line_Item. Main_Menu_Line_Item 600 includes a Line_Item_Name 602, and a State_Machine_Identity 605. Line_Item_Name 602 stores a name. State_Machine_Identity 605 refers to a Console Controller State Machine 400. Main Menu State Machine 500 includes state variable Main_Menu_Line_Item_Table_Index. Main_Menu_Line_Item_Table_Index refers to a Main_Menu_Line_Item 600 in the Main_Menu_Line_Item_Table.

Main Menu Initial State 510 is the Initial State 410 of Main Menu State Machine 500. Main Menu State Machine 500 includes a plurality of State 430; Main Menu State-A 530, and Main Menu State-B 550. Main Menu State Machine 500 includes a plurality of State Transition 450; Main Menu Transition-A 513 and Main Menu Transition-B 515. Main Menu State Machine 500 includes a plurality of Trigger Event 470; Trigger Event-SCROLL 5133 and Trigger Event-SELECT 5153.

Main Menu Initial State

Console Controller 250 starts Main Menu State Machine 500.

In one embodiment, Console Controller 250 starts Main Menu State Machine 500 when a user switches on the power at Consumer Network Device 280. Main Menu State Machine 500 enters Main Menu Initial State 510. Main Menu State Machine 500 sets Main_Menu_Line_Item_Table_Index to refer to the first Main_Menu_Line_Item 600 in the Main_Menu_Line_Item_Table. Main Menu State Machine 500 enters Main Menu State-A 530.

Main Menu State-A

Figure 7:
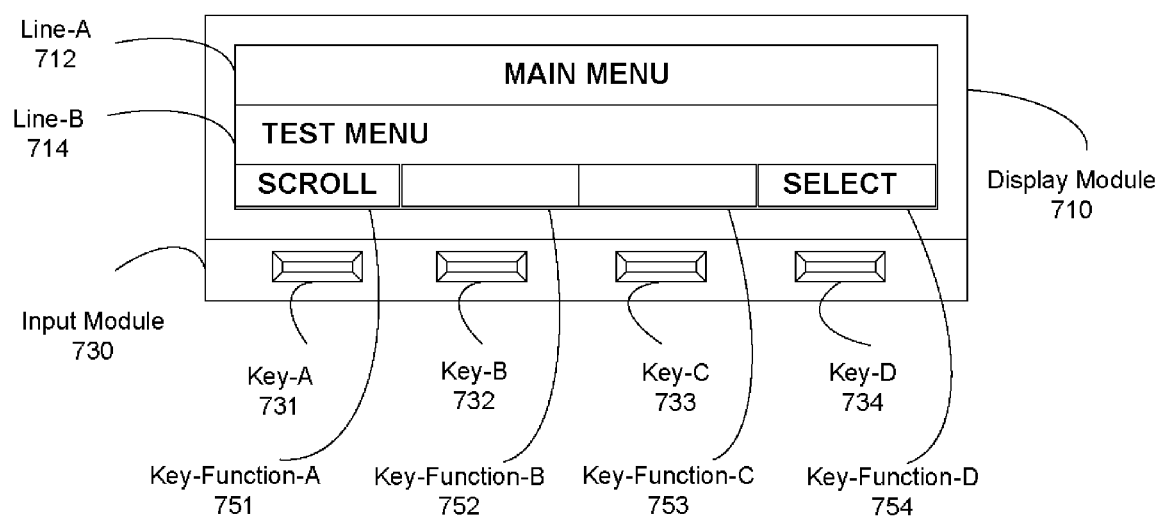
FIG. 7 is a representation of a Display Module and Input Module for Main Menu State Machine in Main Menu State-A according to one embodiment of the present invention.

FIG. 7 illustrates an example of Output Module 710 after the display actions.

In FIG. 7, Main Menu State Machine 500 displays "MAIN MENU" on Line-A 712. Main Menu State Machine 500 retrieves the Main_Menu_Line_Item 600 referred to by Main_Menu_Line_Item_Table_Index. Main Menu State Machine 500 displays the name stored in the Line_Item_Name 602 on Line-B 714, for example, "TEST MENU". Main Menu State Machine 500 displays "SCROLL" on Key-Function-A 751 and "SELECT" on Key-Function-D 754.

Main Menu State-B

Console Controller 250 stops Main Menu State Machine 500. Console Controller 250 retrieves the Main_Menu_Line_Item 600 referred to by Main_Menu_Line_Item_Table_Index, and starts the Console Controller State Machine 400 referred to by the State_Machine_Identity 605.

Main Menu Transition-A

In FIG. 7, when a user presses Key-A 731. Main Menu State Machine 500 determines that Trigger Event-SCROLL 5133 has occurred and triggers Main Menu Transition-A 513. Main Menu State Machine 500 changes Main_Menu_Line_Item_Table_Index to refer to the next Main_Menu_Line_Item 600 in the Main_Menu_Line_Item_Table.

Main Menu Transition-B

In FIG. 7, when a user presses Key-D 734. Main Menu State Machine 500 determines that Trigger Event-SELECT 5153 has occurred and triggers Main Menu Transition-B 515. Main Menu State Machine 500 takes no action in Main Menu Transition-B 515.

Status Menu State Machine

Figure 8:
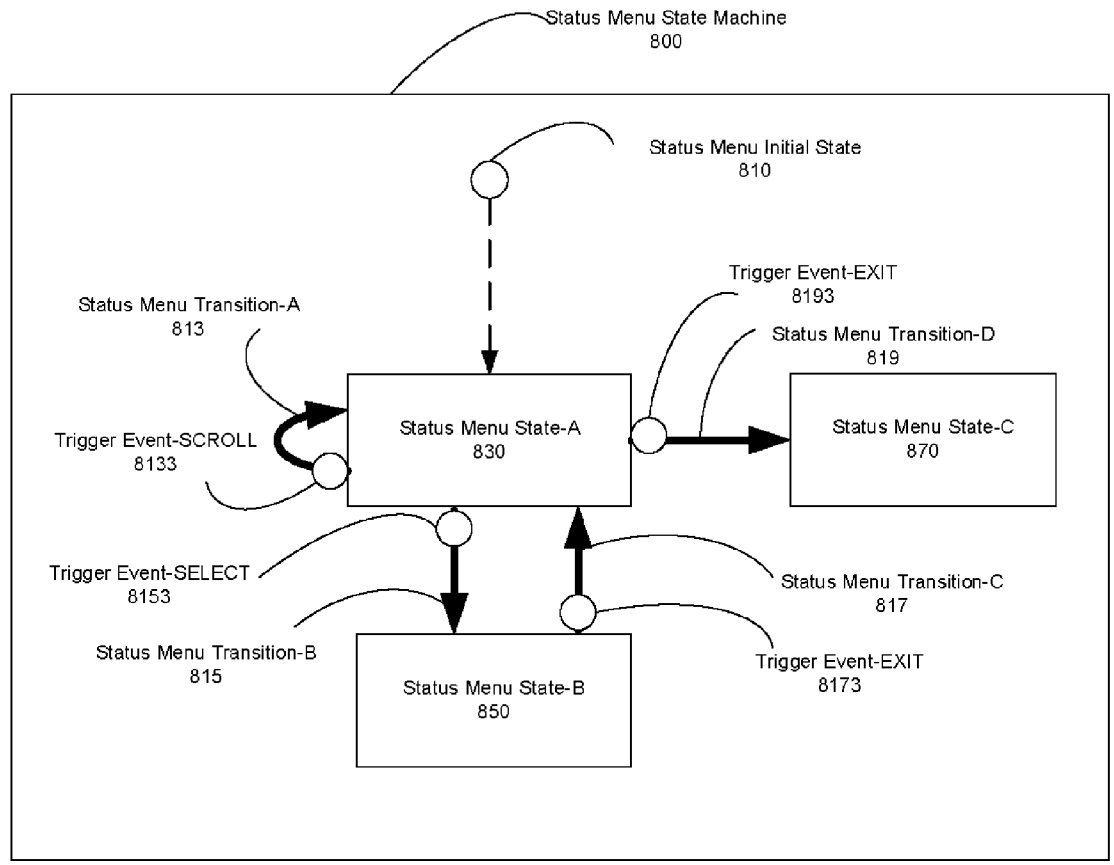
FIG. 8 is a block diagram illustrating a Status Menu State Machine according to one embodiment of the present invention.

FIG. 8 illustrates a Status Menu State Machine. Status Menu State Machine 800 is a Console Controller State Machine 400. Status Menu State Machine 800 includes a Status_Menu_Line_Item_Table. Status_Menu_Line_Item_Table includes a plurality of Status_Menu_Line_Item.

In one embodiment, the Console Controller 250 includes a Status Menu State Machine.

Figure 9:
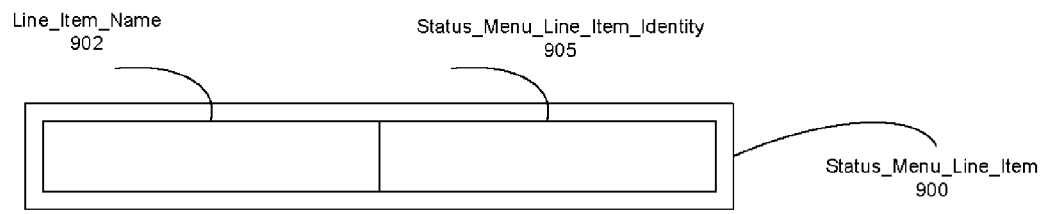
FIG. 9 is a representation of a Status_Menu_Line_Item according to one embodiment of the present invention.

FIG. 9 illustrates a Status_Menu_Line_Item. Status_Menu_Line_Item 900 includes a Line_Item_Name 902, and a Status_Menu_Line_Item_Identity 905. Line_Item_Name 902 stores a name. Status_Menu_Line_Item_Identity 905 relates to a plurality of Network Function Component 275. Status Menu State Machine 800 has a state variable Status_Menu_Line_Item_Table_Index. Status_Menu_Line_Item_Table_Index refers to a Status_Menu_Line_Item 900 in the Status_Menu_Line_Item_Table.

Status Menu Initial State 810 is the Initial State 410 of Status Menu State Machine 800. Status Menu State Machine 800 includes a plurality of State 430; Status Menu State-A 830, Status Menu State-B 850, and Status Menu State-C 870. Status Menu State Machine 800 includes a plurality of State Transition 450; Status Menu Transition-A 813, Status Menu Transition-B 815, Status Menu Transition-C 817, and Status Menu Transition-D 819. Status Menu State Machine 800 includes a plurality of Trigger Event 470; Trigger Event-SCROLL 8133, Trigger Event-SELECT 8153, Trigger Event-EXIT 8173, and Trigger Event-EXIT 8193.

Status Menu Initial State

In one embodiment, Console Controller 250 starts Status Menu State Machine 800 as an action in the Main Menu State-B 550. Status Menu State Machine 800 sets Status_Menu_Line_Item_Table_Index to refer to the first Status_Menu_Line_Item 900 in the Status_Menu_Line_Item_Table. Status Menu State Machine 800 enters Status Menu State-A 830.

Status Menu State-A

Figure 10:
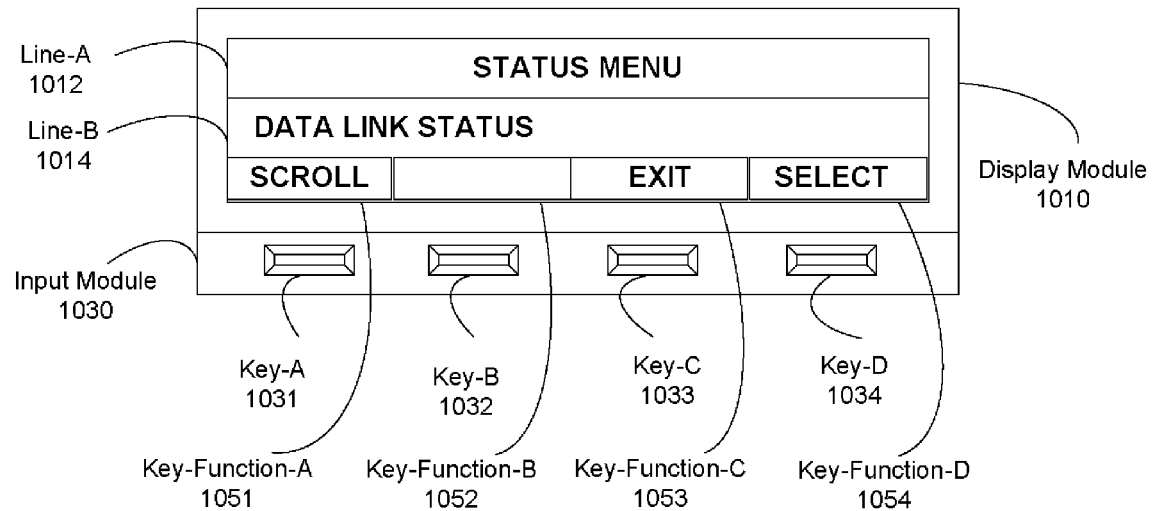
FIG. 10 is a representation of a Display Module and Input Module for Status Menu State Machine in Status Menu State-A according to one embodiment of the present invention.

In FIG. 10, Status Menu State Machine 800 displays "STATUS MENU" on Line-A 1012. Status Menu State Machine 800 retrieves the Status_Menu_Line_Item 900 referred to by Status_Menu_Line_Item_Table_Index. Status Menu State Machine 800 displays the name stored in the Line_Item_Name 902 on Line-B 1014, for example, "DATA LINK STATUS". Status Menu State Machine 800 displays "SCROLL" on Key-Function-A 1051, "EXIT" on Key-Function-C 1053 and "SELECT" on Key-Function-D 1054.

FIG. 10 illustrates an example of Display Module 1010 after the display actions.

Status Menu State-B

Figure 11:
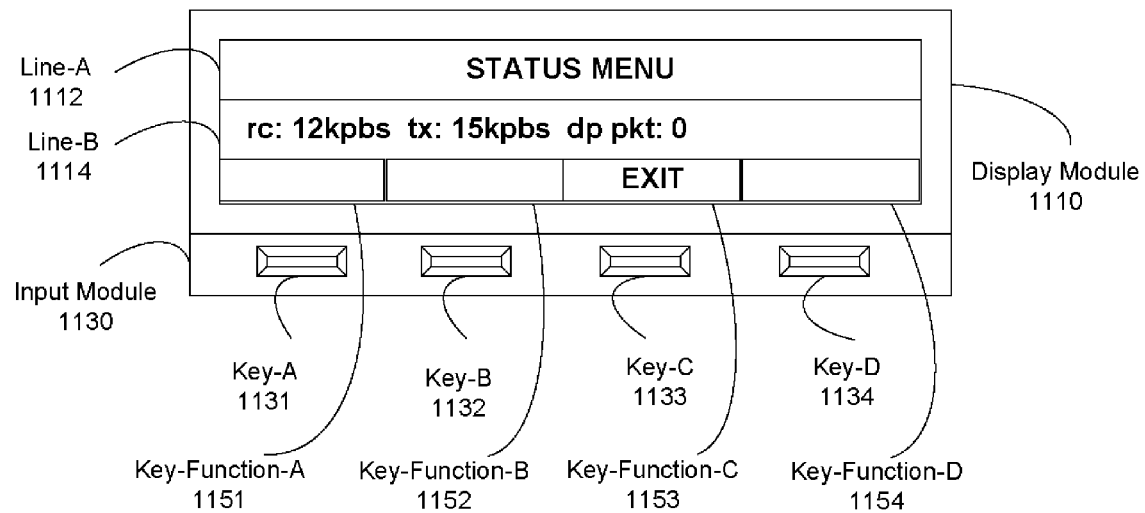
FIG. 11 is a representation of a Display Module and Input Module for Status Menu State Machine in Status Menu State-B according to one embodiment of the present invention.

In FIG. 11, Status Menu State Machine 800 displays "EXIT" on Key-Function-C 1153.

Status Menu State Machine 800 retrieves the Status_Menu_Line_Item 900 referred to by Status_Menu_Line_Item_Table_Index. Status Menu State Machine 800 sends a request to the Network Application 270 via the Operation and Management Interface 205. The request includes the Status_Menu_Line_Item_Identity 905. Network Application 270 sends the result to the Console Controller 250. Status Menu State Machine 800 displays the result, for example, "rc: 12 kpbs tx: 15 kpbs dp pkt: 0" on Line-B 1114.

FIG. 11 illustrates an example of Display Module 1110 after the display actions.

Status Menu State-C

Console Controller 250 stops Status Menu State Machine 800. Console Controller 250 starts Main Menu State Machine 500.

Status Menu Transition-A

In FIG. 10, when a user presses Key-A 1031. Status Menu State Machine 800 determines that Trigger Event-SCROOL 8133 has occurred and triggers Status Menu Transition-A 813. Status Menu State Machine 800 changes Status_Menu_Line_Item_Table_Index to refer to the next Status_Menu_Line_Item 900 in the Status_Menu_Line_Item_Table.

Status Menu Transition-B

In FIG. 10, when a user presses Key-D 1034. Status Menu State Machine 800 determines that Trigger Event-SELECT 8153 has occurred and triggers Status Menu Transition-B 815. Status Menu State Machine 800 takes no action in Status Menu Transition-B 815.

Status Menu Transition-C

In FIG. 11, when a user presses Key-C 1133. Status Menu State Machine 800 determines that Trigger Event-EXIT 8173 has occurred and triggers Status Menu Transition-C 817. Status Menu State Machine 800 takes no action in Status Menu Transition-C 817.

Status Menu Transition-D

In FIG. 10, when a user presses Key-C 1033. Status Menu State Machine 800 determines that Trigger Event-8193 has occurred and triggers Status Menu Transition-D 819. Status Menu State Machine 800 takes no action in Status Menu Transition-D 819.

Set Menu State Machine

In one embodiment, the Console Controller 250 includes a Set Menu State Machine.

Figure 12:
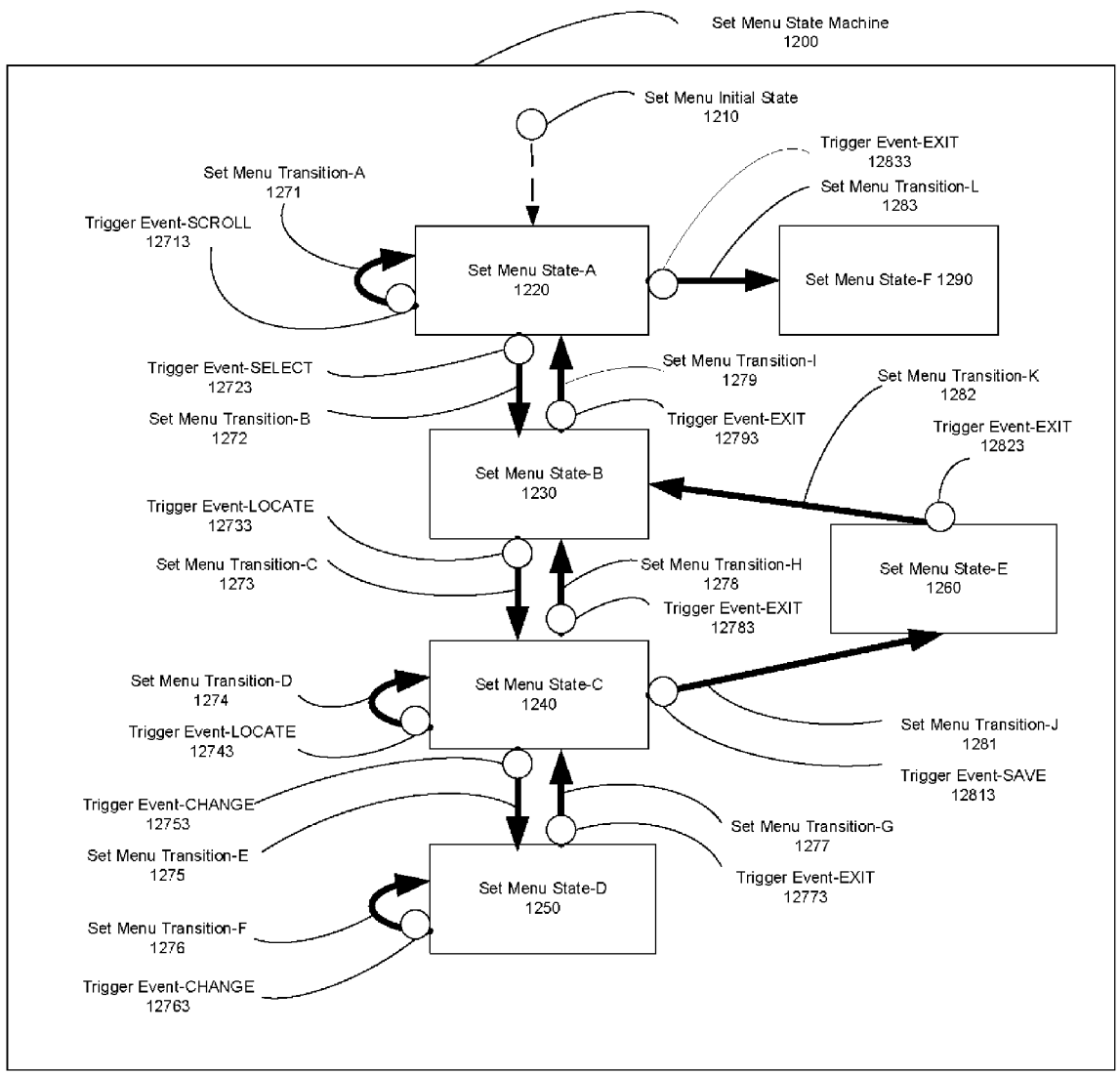
FIG. 12 is a block diagram illustrating a Set Menu State Machine according to one embodiment of the present invention.

FIG. 12 illustrates a Set Menu State Machine. Set Menu State Machine 1200 is a Console Controller State Machine 400. Set Menu State Machine 1200 includes a Set_Menu_Line_Item_Table. Set_Menu_Line_Item_Table includes a plurality of Set_Menu_Line_Item.

Figure 13:
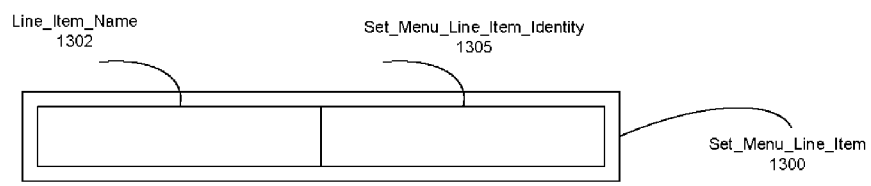
FIG. 13 is a representation of a Set_Menu_Line_Item according to one embodiment of the present invention.

FIG. 13 illustrates a Set_Menu_Line_Item. Set_Menu_Line_Item 1300 includes a Line_Item_Name 1302, and a Set_Menu_Line_Item_Identity 1305. Line_Item_Name 1302 stores a name. Set_Menu_Line_Item_Identity 1305 relates to a plurality of Network Function Component 275. Set Menu State Machine 1200 includes state variables Set_Menu_Line_Item_Table_Index, Set_Menu_Line_Item_Value, and Set_Menu_Line_Item_Value_Character_Index. Set_Menu_Line_Item_Table_Index refers to a Set_Menu_Line_Item 1300 in the Set_Menu_Line_Item_Table. Set_Menu_Line_Item_Value includes a plurality of alphanumeric character. Set_Menu_Line_Item_Value_Character_Index refers to an alphanumeric character in Set_Menu_Line_Item_Value.

Set Menu Initial State 1210 is the Initial State 410 of Set Menu State Machine 1200. Set Menu State Machine 1200 includes a plurality of State 430; Set Menu State-A 1220. Set Menu State-B 1230, Set Menu State-C 1240, Set Menu State-D 1250, Set Menu State-E 1260, and Set Menu State-F 1290. Set Menu State Machine 1200 includes a plurality of State Transition 450; Set Menu Transition-A 1271, Set Menu Transition-B 1272, Set Menu Transition-C 1273, Set Menu Transition-D 1274, Set Menu Transition-E 1275. Set Menu Transition-F 1276, Set Menu Transition-G 1277, Set Menu Transition-H 1278, Set Menu Transition-I 1279, Set Menu Transition-J 1281, Set Menu Transition-K 1282, and Set Menu Transition-L 1283. Set Menu State Machine 1200 includes a plurality of Trigger Event 470; Trigger Event-SCROLL 12713, Trigger Event-SELECT 12723, Trigger Event-LOCATE 12733, Trigger Event-LOCATE 12743, Trigger Event-CHANGE 12753, Trigger Event-CHANGE 12763, Trigger Event-EXIT 12773, Trigger Event-EXIT 12783, Trigger Event-EXIT 12793, Trigger Event-SAVE 12813, Trigger Event-EXIT 12823, and Trigger Event-EXIT 12833.

Set Menu Initial State

In one embodiment, Console Controller 250 starts Set Menu State Machine 1200 as an action in the Main Menu State-B 550. Set Menu State Machine 1200 sets Set_Menu_Line_Item_Table_Index to refer to the first Set_Menu_Line_Item 1300 in the Set_Menu_Line_Item_Table. Set Menu State Machine 1200 enters Set Menu State-A 1220.

Set Menu State-A

Figure 14:
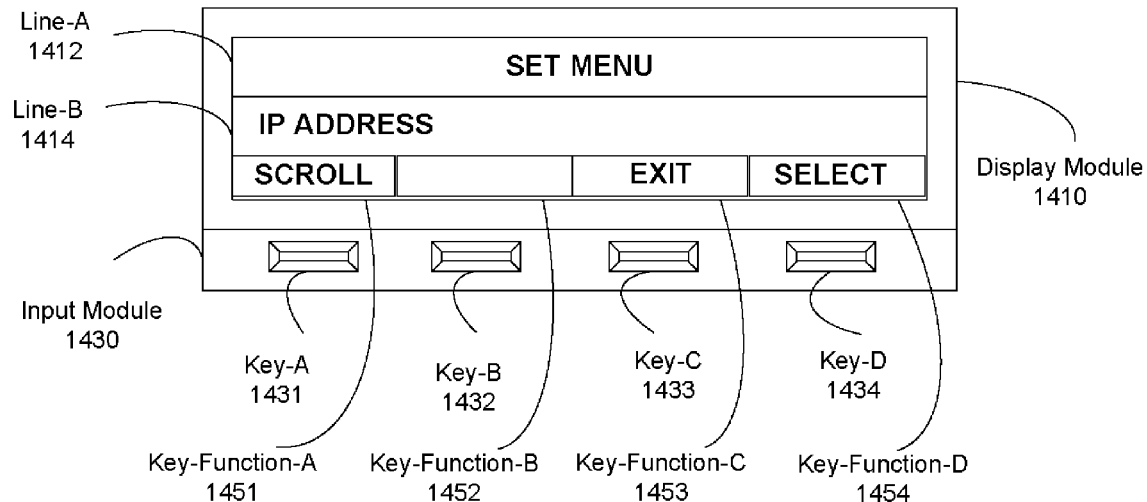
FIG. 14 is a representation of a Display Module and Input Module for Set Menu State Machine in Set Menu State-A according to one embodiment of the present invention.

In FIG. 14, Set Menu State Machine 1200 displays "SET MENU" on Line-A 1412.

Set Menu State Machine 1200 retrieves the Set_Menu_Line_Item 1300 referred to by Set_Menu_Line_Item_Table_Index. Set Menu State Machine displays the name stored in the Line_Item Name 1302 on Line-B 1414, for example, "IP ADDRESS". Set Menu State Machine 1200 displays "SCROLL" on Key-Function-A 1451, "EXIT" on Key-Function-C 1453 and "SELECT" on Key-Function-D 1454.

FIG. 14 illustrates an example of Output Module 1410 after the display actions.

Set Menu State-B

Figure 15:
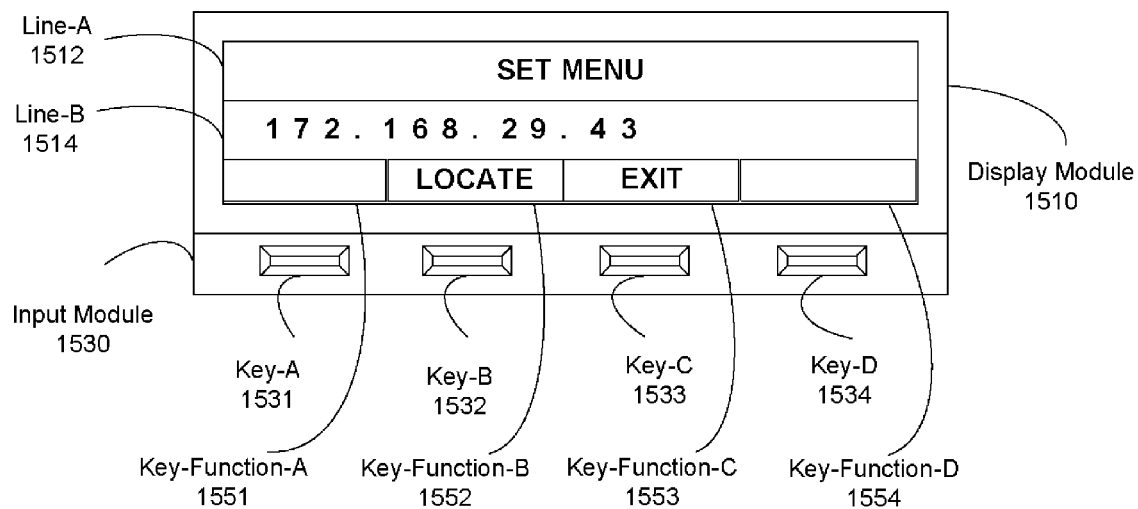
FIG. 15 is a representation of a Display Module and Input Module for Set Menu State Machine in Set Menu State-B according to one embodiment of the present invention.

In FIG. 15, Set Menu State Machine 1200 displays "LOCATE" on Key-Function-B 1552 and "EXIT" on Key-Function-C 1553. Set Menu State Machine 1200 retrieves the Set_Menu_Line_Item 1300 referred to by Set_Menu_Line_Item_Table_Index. Set Menu State Machine sends a request to the Network Application 270 via the Operation and Management Interface 205. The request includes the Set_Menu_Line_Item_Identity 1305. Network Application 270 sends the result to the Console Controller 250. Set Menu State Machine 1200 stores the result in Set_Menu_Line_Item_Value. Set Menu State Machine 1200 displays the result, for example, "172.168.29.43" on Line-B 1514.

FIG. 15 illustrates an example of Output Module 1510 after the display actions.

Set Menu State-C

Figure 16:
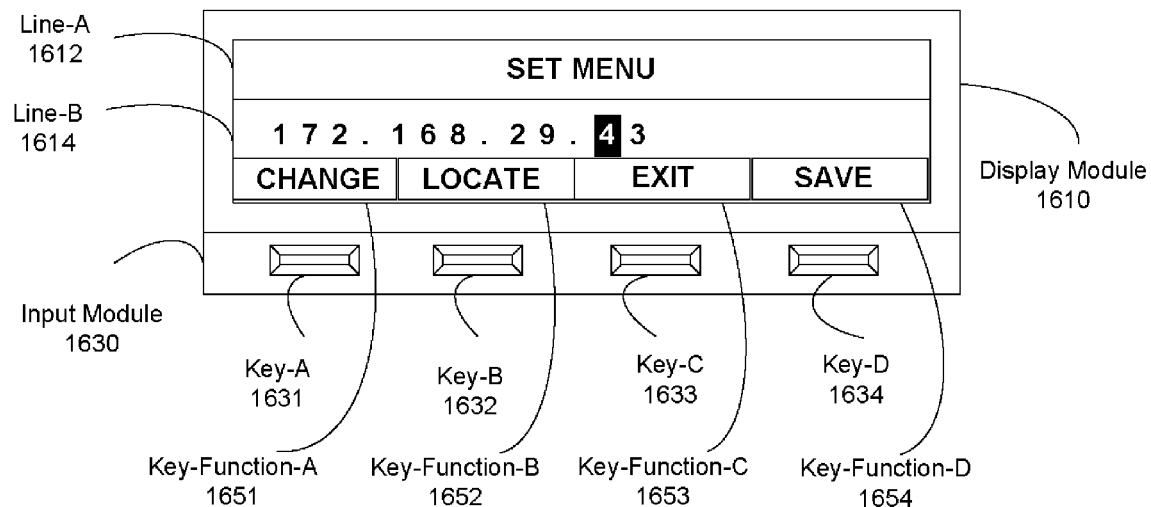
FIG. 16 is a representation of a Display Module and Input Module for Set Menu State Machine in Set Menu State-C according to one embodiment of the present invention.

In FIG. 16, Set Menu State Machine 1200 displays "CHANGE" on Key-Function-A 1651, "LOCATE" on Key-Function-B 1652, "EXIT" on Key-Function-C 1653, and "SAVE" on Key-Function-D 1654. Set Menu State Machine 1200 displays Set_Menu_Line_Item_Value on Line-B 1614, and highlights the alphanumeric character referred to by Set_Menu_Line_Item_Value_Character_Index. In one embodiment, Set_Menu_Line_Item_Value_Character_Index refers to the second alphanumeric character. Set Menu State Machine 1200 displays "172.168.29.43" with the second alphanumeric character "4" in white color and darkened background. In a different embodiment, Set Menu State Machine 1200 underlines the second alphanumeric character "4" on Line-B 1614.

FIG. 16 illustrates an example of Output Module 1610 after the display actions.

Set Menu State-D

Figure 17:
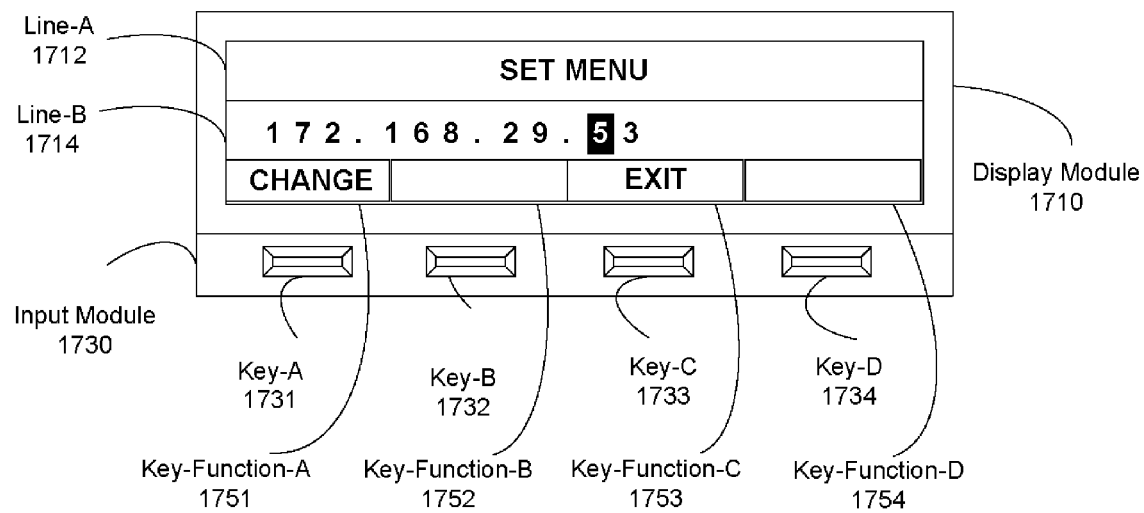
FIG. 17 is a representation of a Display Module and Input Module for Set Menu State Machine in Set Menu State-D according to one embodiment of the present invention.

In FIG. 17, Set Menu State Machine 1200 displays "CHANGE" on Key-Function-A 1751 and "EXIT" on Key-Function-C 1753. Set Menu State Machine 1200 changes the alphanumeric character referred to by Set_Menu_Line_Item_Value_Character_Index to the next alphanumeric value. In one embodiment, the alphanumeric character has an alphanumeric value of "4". Set Menu State Machine 1200 changes the alphanumeric value from "4" to "5". Set Menu State Machine 1200 displays Set_Menu_Line_Item_Value on Line-B 1714, and highlights the alphanumeric character referred to by Set_Menu_Line_Item_Character_Index. For example, Set Menu State Machine 1200 displays "172.168.29.53" and highlights the alphanumeric character "5".

FIG. 17 illustrates an example of Output Module 1710 after the display actions.

Set Menu State-E

Figure 18:
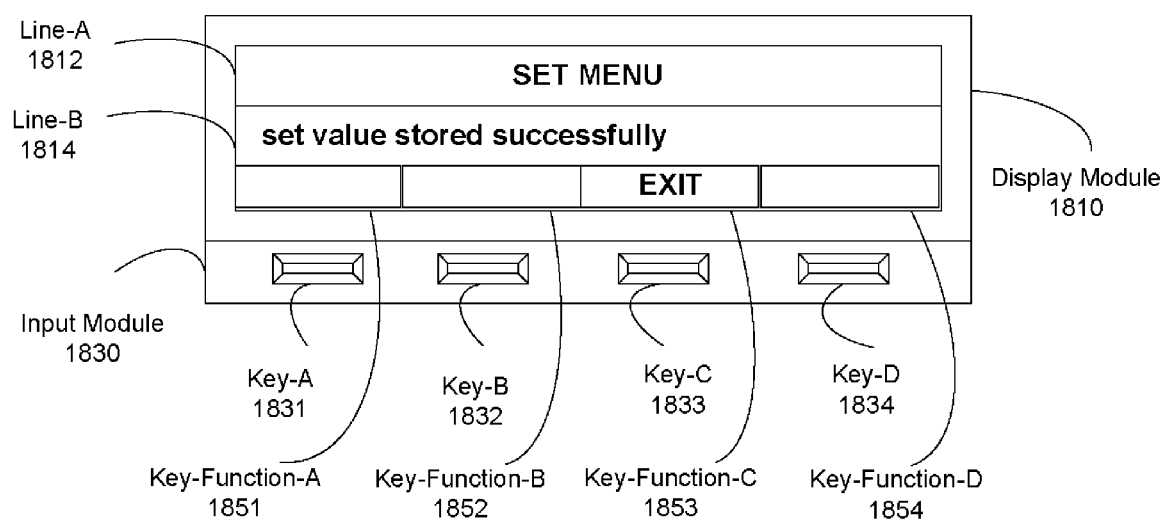
FIG. 18 is a representation of a Display Module and Input Module for Set Menu State Machine in Set Menu State-E according to one embodiment of the present invention.

In FIG. 18, Set Menu State Machine 1200 displays "EXIT" on Key-Function-C 1853.

Set Menu State Machine 1200 retrieves the Set_Menu_Line_Item 1300 referred to by Set_Menu_Line_Item_Table_Index. Set Menu State Machine sends a request to the Network Application 270 via the Operation and Management Interface 205. The request includes the Set_Menu_Line_Item_Identity 1305, and the Set_Menu_Line_Item_Value. Network Application 270 sends the result to the Console Controller 250. Set Menu State Machine 1200 determines the content and sends the content to Display Module 1810 for display. In one embodiment, Set Menu State Machine 1200 displays "set value stored successfully" on Line-B 1814.

FIG. 18 illustrates an example of Output Module 1810 after the display actions.

Set Menu State-F

The Console Controller 250 stops Set Menu State Machine 1200. The Console Controller 250 starts Main Menu State Machine 500.

Set Menu Transition-A

In FIG. 14, when a user presses Key-A 1431. Set Menu State Machine 1200 determines that Trigger Event-SCROLL 12713 has occurred and triggers Set Menu Transition-A 1271. Set Menu State Machine 1200 sets the value of Set_Menu_Line_Item_Table_Index to refer to the next Set_Menu_Line_Item of the Set_Menu_Line_Item_Table.

Set Menu Transition-B

In FIG. 14, when a user presses Key-D 1434. Set Menu State Machine 1200 determines that Trigger Event-SELECT 12723 has occurred and triggers Set Menu Transition-B 1272. Set Menu State Machine 1200 takes no action in Set Menu Transition-B 1272.

Set Menu Transition-C

In FIG. 15, when a user presses Key-C 1532. Set Menu State Machine 1200 determines that Trigger Event-LOCATE 12733 has occurred and triggers Set Menu Transition-C 1273. Set Menu State Machine 1200 sets Set_Menu_Line_Item_Value_Character_Index to refer to the first alphanumeric character of the Set_Menu_Line_Item_Value.

Set Menu Transition-D

In FIG. 16, when a user presses Key-B 1632. Set Menu State Machine 1200 determines that Trigger Event-LOCATE 12743 has occurred and triggers Set Menu Transition-D 1274. Set Menu State Machine 1200 sets Set_Menu_Line_Item_Value_Character_Index to refer to the next alphanumeric character of the Set_Menu_Line_Item_Value.

Set Menu Transition-E

In FIG. 16, when a user presses Key-A 1631. Set Menu State Machine 1200 determines that Trigger Event-CHANGE 12753 has occurred and triggers Set Menu Transition-E 1275. Set Menu State Machine 1200 takes no action in Set Menu Transition-E 1275.

Set Menu Transition-F

In FIG. 17, when a user presses Key-A 1731. Set Menu State Machine 1200 determines that Trigger Event-CHANGE 12763 has occurred and triggers Set Menu Transition-F 1276. Set Menu State Machine 1200 takes no action in Set Menu Transition-F 1276.

Set Menu Transition-G

In FIG. 17, when a user presses Key-C 1733. Set Menu State Machine 1200 determines that Trigger Event-EXIT 12773 has occurred and triggers Set Menu Transition-G 1277. Set Menu State Machine 1200 takes no action in Set Menu Transition-G 1277.

Set Menu Transition-H

In FIG. 16, when a user presses Key-C 1633. Set Menu State Machine 1200 determines that Trigger Event-EXIT 12783 has occurred and triggers Set Menu Transition-H 1278. Set Menu State Machine 1200 takes no action in Set Menu Transition-H 1278.

Set Menu Transition-I

In FIG. 15, when a user presses Key-C 1533. Set Menu State Machine 1200 determines that Trigger Event-EXIT 12793 has occurred and triggers Set Menu Transition-I 1279. Set Menu State Machine 1200 takes no action in Set Menu Transition-I 1279.

Set Menu Transition-J

In FIG. 16, when a user presses Key-D 1634. Set Menu State Machine 1200 determines that Trigger Event-SAVE 12813 has occurred and triggers Set Menu Transition-J 1281. Set Menu State Machine 1200 takes no action in Set Menu Transition-J 1281.

Set Menu Transition-K

In FIG. 18, when a user presses Key-C 1833. Set Menu State Machine 1200 determines that Trigger Event-EXIT 12823 has occurred and triggers Set Menu Transition-K 1282. Set Menu State Machine 1200 takes no action in Set Menu Transition-K 1282.

Set Menu Transition-L

In FIG. 14, when a user presses Key-C 1433. Set Menu State Machine 1200 determines that Trigger Event-EXIT 12833 has occurred and triggers Set Menu Transition-L 1283. Set Menu State Machine 1200 takes no action in Set Menu Transition-L 1283.

Test Menu State Machine

In one embodiment, the Console Controller 250 includes a Test Menu State Machine.

Figure 19:
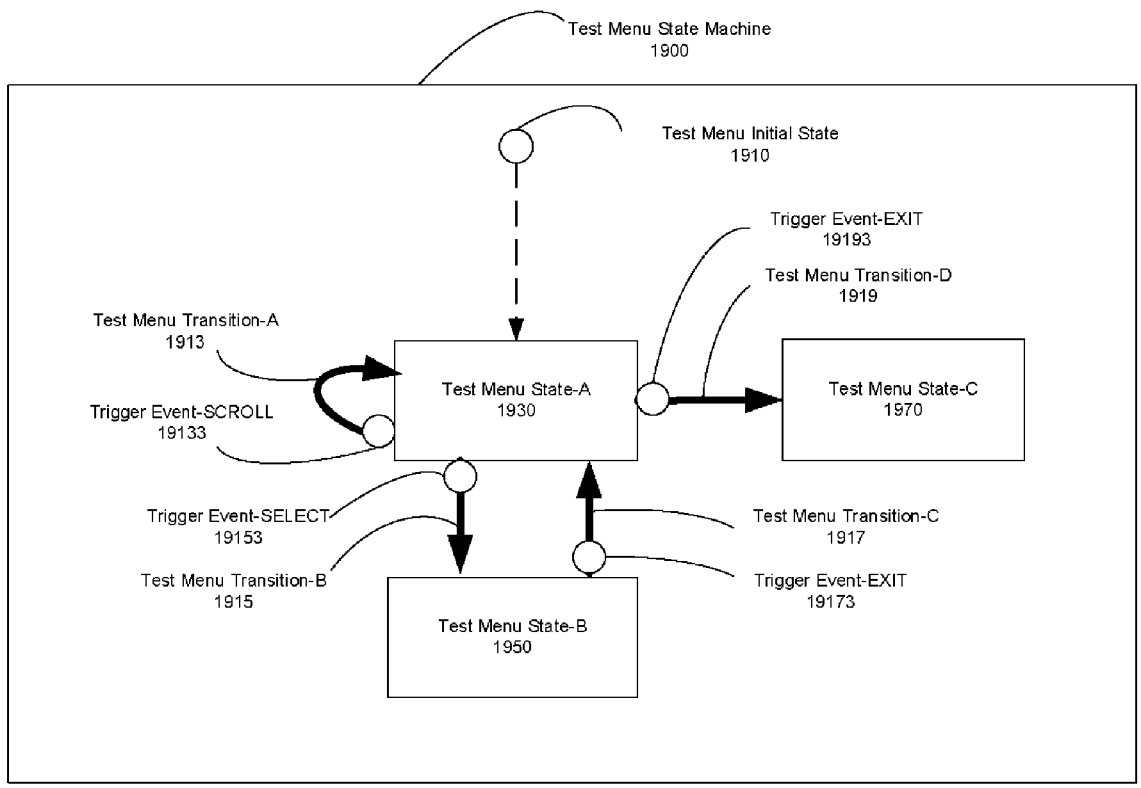
FIG. 19 is a block diagram illustrating a Test Menu State Machine according to one embodiment of the present invention.

FIG. 19 illustrates a Test Menu State Machine. Test Menu State Machine 1900 is a Console Controller State Machine 400. Test Menu State Machine 1900 includes a Test_Menu_Line_Item_Table. Test_Menu_Line_Item_Table includes a plurality of Test_Menu_Line_Item.

Figure 20:
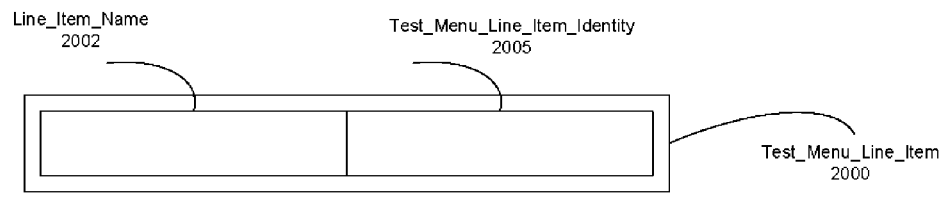
FIG. 20 is a representation of a Test_Menu_Line_Item according to one embodiment of the present invention.

FIG. 20 illustrates a Test_Menu_Line_Item. Test_Menu_Line_Item 2000 includes a Line_Item_Name 2002, and a Test_Menu_Line_Item_Identity 2005. Line_Item_Name 2002 stores a name. Test_Menu_Line_Item_Identity 2005 relates to a plurality of Network Function Component 275. Test Menu State Machine 1900 has a state variable Test_Menu_Line_Item_Table_Index. Test_Menu_Line_

Item_Table_Index refers to a Test_Menu_Line_Item 2000 in the Test_Menu_Line_Item_Table.

Test Menu Initial State 1910 is the Initial State 410 of Test Menu State Machine 1900. Test Menu State Machine 1900 includes a plurality of State 430; Test Menu State-A 1930, Test Menu State-B 1950, and Test Menu State-C 1970. Test Menu State Machine 1900 includes a plurality of State Transition 450; Test Menu Transition-A 1913, Test Menu Transition-B 1915, Test Menu Transition-C 1917, and Test Menu Transition-D 1919. Test Menu State Machine 1900 includes a plurality of Trigger Event 470; Trigger Event-SCROLL 19133, Trigger Event-SELECT 19153, Trigger Event-EXIT 19173, and Trigger Event-EXIT 19193.

Test Menu Initial State

In one embodiment, Console Controller 250 starts Test Menu State Machine 1900 as an action in the Main Menu State-B 550. Test Menu State Machine 1900 sets Test_Menu_Line_Item_Table_Index to refer to the first Test_Menu_Line_Item 2000 in the Test_Menu_Line_Item_Table. Test Menu State Machine 1900 enters Test Menu State-A 1930.

Test Menu State-A

Figure 21:
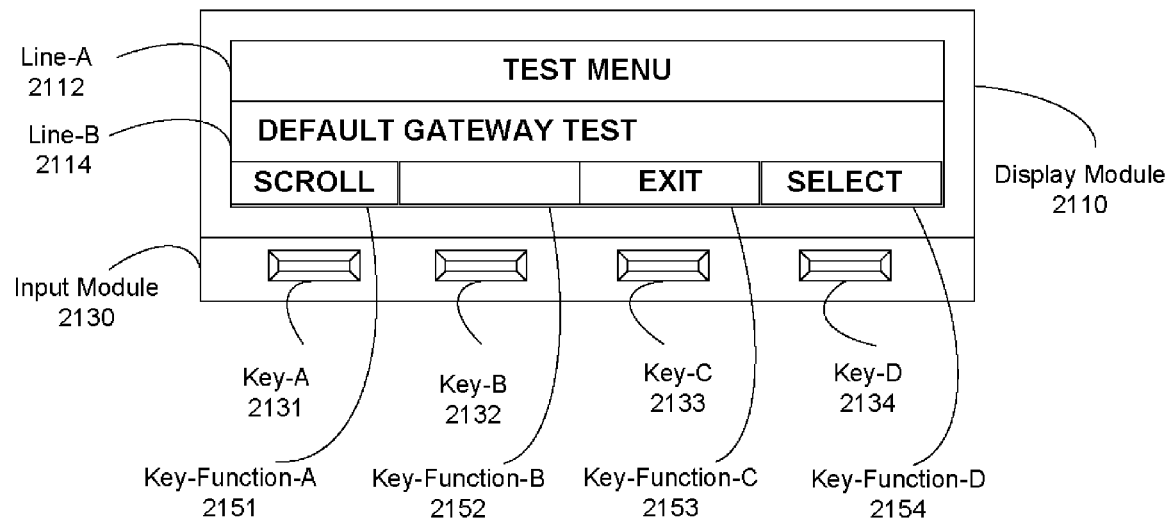
FIG. 21 is a representation of a Display Module and Input Module for Test Menu State Machine in Test Menu State-A according to one embodiment of the present invention.

FIG. 21 illustrates an example of Display Module 2110 after the display actions.

In FIG. 21, Test Menu State Machine 1900 displays "TEST MENU" on Line-A 2112. Test Menu State Machine 1900 retrieves the Test_Menu_Line_Item 2000 referred to by Test_Menu_Line_Item_Table_Index. Test Menu State Machine displays the name stored in the Line_Item_Name 2002 on Line-B 2114, for example, "DEFAULT GATEWAY TEST". Test Menu State Machine 1900 displays "SCROLL" on Key-Function-A 2151, "EXIT" on Key-Function-C 2153 and "SELECT" on Key-Function-D 2154.

Test Menu State-B

Figure 22:
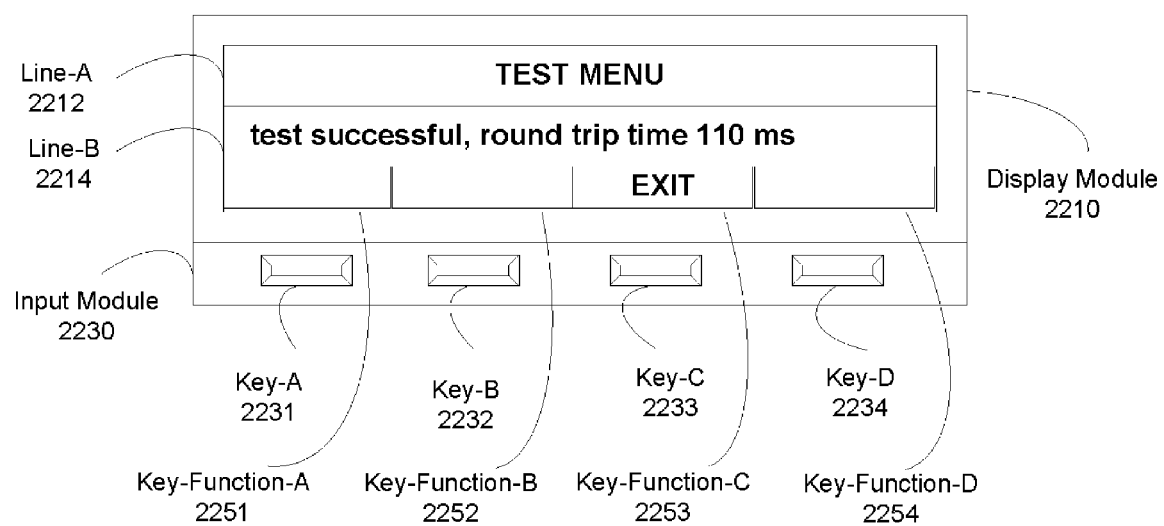
FIG. 22 is a representation of a Display Module and Input Module for Test Menu State Machine in Test Menu State-B according to one embodiment of the present invention.

FIG. 22 illustrates an example of Display Module 2210 after the display actions.

In FIG. 22, Test Menu State Machine 1900 displays "EXIT" on Key-Function-C 2253. Test Menu State Machine 1900 retrieves the Test_Menu_Line_Item 2000 referred to by Test_Menu_Line_Item_Table_Index. Test Menu State Machine 1900 sends a request to the Network Application 270 via the Operation and Management Interface 205. The request includes the Test_Menu_Line_Item_Identity 2005. Network Application 270 sends the result to the Console Controller 250. Test Menu State Machine 1900 displays the result, for example, "test successful, round trip time 110 ms on Line-B 2214.

Test Menu State-C

The Console Controller 250 stops Test Menu State Machine 1900. Console Controller 250 starts Main Menu State Machine 500.

Test Menu Transition-A

In FIG. 21, when a user presses Key-A 2131. Test Menu State Machine 1900 determines that Trigger Event-SCROOL, 19133 has occurred and triggers Test Menu Transition-A 1913. Test Menu State Machine 1900 changes Test_Menu_Line_Item_Table_Index to refer to the next Test_Menu_Line_Item 2000 in the Test_Menu_Line_Item_Table.

Test Menu Transition-B

In FIG. 21, when a user presses Key-D 2134. Test Menu State Machine 1900 determines that Trigger Event-SELECT 19153 has occurred and triggers Test Menu Transition-B 1915. Test Menu State Machine 1900 takes no action in Test Menu Transition-B 1915.

Test Menu Transition-C

In FIG. 22, when a user presses Key-C 2233. Test Menu State Machine 1900 determines that Trigger Event-EXIT 19173 has occurred and triggers Test Menu Transition-C 1917. Test Menu State Machine 1900 takes no action in Test Menu Transition-C 1917.

Test Menu Transition-D

In FIG. 21, when a user presses Key-C 2133. Test Menu State Machine 1900 determines that Trigger Event-EXIT 19193 has occurred and triggers Test Menu Transition-D 1919. Test Menu State Machine 1900 takes no action in Test Menu Transition-D 1919.

Control Console and Console Controller State Machine

In one embodiment, the Console Controller 250 obtains the Main_Menu_Line_Item_Table, the Status_Menu_Line_Item_Table, the Set_Menu_Line_Item_Table, and the Test_Menu_Line_Item_Table from the Network Application 270 over the Operation and Management Interface 205.

In one embodiment, Main_Menu_Line_Item_Table, Status_Menu_Line_Item_Table, Set_Menu_Line_Item_Table, the Test_Menu_Line_Item_Table are part of the programming functionalities of Console Controller 250.

In one embodiment, Control Console 200 includes a data store. In one embodiment, the data store is a flash memory.

In one embodiment, the data store is a hard disk. In a different embodiment, the data store is a memory. Console Controller 250 retrieves Main_Menu_Line_Item Table, Status_Menu_Line_Item_Table, Set_Menu_Line_Item_Table, and Test_Menu_Line_Item_Table from the data store.

One Key Testing

In one embodiment, the Input Module includes an additional single-test-key. A user presses the single-test-key. The Console Controller sends a request to a Network Application to invoke a set of tests for a plurality of Network Function Component.

In one embodiment, the set of tests includes all tests invoked by the Test Menu State Machine. In another embodiment, the set of tests is a subset of the tests invoked by Test Menu State Machine. Console Controller communicates with Network Application to invoke the tests.

In one embodiment, Console Controller determines the set of tests and communicates with Network Application to invoke these tests.

In one embodiment, Console Controller communicates with Network Application and Network Application determines the set of tests to conduct. Network Application conducts the tests and sends the test result to Console Controller. Console Controller receives the test results and determines the content to display and sends the content to the Display Module for display.

In one embodiment, the content to display includes one line. In another embodiment, the content to display includes multiple lines. Console Controller allows the user to use an input key in Input Module to scroll through the multiple lines of test result.

Input and Display Modules Revisited

The foregoing description illustrates a Display Module with three lines of display.

In one embodiment, the Display Module includes five lines of display.

In one embodiment, Display Module includes one line of display.

In one embodiment, the line of display is shorter than the content to display. The Console Controller allows the user to use an input key in the Input Module to scroll through the content on the line of display.

In one embodiment, Display Module includes a graphic display.

In one embodiment, Display Module includes a speaker.

In one embodiment, Console Controller converts the content to voice signal and sends the voice signal to the speaker.

In one embodiment, Console Controller sends the content to Display Module. Display Module converts the content to voice signal and sends the voice signal to the speaker.

In one embodiment, the Input Module includes seven input keys.

In one embodiment, Input Module includes two input keys.

In one embodiment, the Consumer Network Device manufacturer prints the functions of the inputs keys next to the input keys at the Input Module.

In one embodiment, the Consumer Network Device manufacturer prints "EXIT" next to an input key.

In one embodiment, the Consumer Network Device manufacturer prints "SCROLL/CHANGE" next to an input key.

In one embodiment, Input Module includes a microphone. A user reads a voice command to the microphone.

In one embodiment, Input Module includes a voice recognition function. Input Module converts the voice signal to a format for communications with the Console Controller.

In one embodiment, the format for communications is VoiceXML.

In one embodiment, the format for communications is based on proprietary definitions.

In one embodiment, Console Controller includes a voice recognition function. Input Module sends the voice signal to Console Controller. Console Controller processes the voice signal.

Console Controller Revisited

In one embodiment, the Console Controller includes software program running on a microprocessor.

In one embodiment, Console Controller is based on integrated circuit technology.

In an embodiment, Console Controller is implemented in an ASIC.

In one embodiment, Console Controller is based on FPGA technology.

In one embodiment, the Operation and Management Interface is based on FPGA technology.

In one embodiment, Operation and Management Interface is based on shared memory.

In one embodiment, Operation and Management Interface is based on ASIC technology.

In one embodiment, the communications over Operation and Management Interface is based on MIB-II specifications.

In one embodiment, the communications over Operation and Management Interface is based on SMNP standards.

In one embodiment, the communications over Operation and Management Interface is based on standard ECMA-335 Common Language Infrastructure (CLI).

In one embodiment, the communications over Operation and Management Interface is based on EIA/TIA-232 CLI Console Interface.

In one embodiment, the communications over Operation and Management Interface is based on proprietary specifications.

A Console Controller with equivalent functionalities includes a State Machine that has different number of States, different number of State Transitions, different number of Trigger Events, and different number of state variables.

In one embodiment, a Console Controller includes a State Machine with twenty-six States, sixty-four State Transitions, sixty-four Trigger Events, and five state variables.

In one embodiment, a Console Controller includes a State Machine with thirty States, fifty-two State Transitions, fifty-two Trigger Events, and seven state variables.

In one embodiment Control Console 200 can provide support and service for First Day of Service (FDS) capabilities, thus reducing time, cost, frustration and number of returns of product to vendor or manufacturer typically associated with the installation or maintenance of consumer network devices. Typically, FDS capabilities can include, but are not limited to, service configuration, service activation and service confirmation.

In one embodiment, during installation of a consumer network device, network status and configuration information can be displayed on Display Module 210 of Control Console 200 when and if there is a need for a call to the manufacturers technical support.

In one embodiment, Control Console 200 can input network configuration and functionality settings through Input Module 230 as per technical supports instructions; Console Controller 250 can then program Network Application 270 over Operation and Management Interface 205.

In one embodiment, when configuration settings are changed, Control Console 200 can activate any or all settings entered by a user. Console Controller programs network or other functionality settings or configurations to Network Application 270 over Operation and Management Interface 205.

In one embodiment, pay, prepaid or subscription services are associated with the use of a consumer network device, such as, but not limited to, cable television or internet service, virtual private networking, or VoIP telephony service, Control Console 200 can display information and prompts on Display Module 210 for user to remotely activate such services with Input Module 230.

In one embodiment, pay, prepaid or subscription services are associated with the use of a consumer network device, such as, but not limited to, cable television or internet service, virtual private networking, or VoIP telephony service, Control Console 200 can display information and prompts on Display Module 210 for user to remotely confirm such services with Input Module 230.

In one embodiment, remote assistance can be requested, activated and confirmed over a network through a remote assistance network function component executed in a Network Application 270 by Control Console 200.

In one embodiment, Control Console 200 can be programmed to offer remotely-assisted, semiautomatic or automatic initial setup procedures through which a user can review, enter and confirm network device settings.

In one embodiment, Control Console can be programmed to deliver messages, advertisements or offers for services or upgrades.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A network device, comprising:
a network application for providing consumer services from a remote server in a consumer network;
an operation and management interface; and
a control console comprising a console controller coupled to the network application over the operation and management interface, an input module, and a display module,
wherein the control console receives input data from a user through the input module and sends a request to the network application over the operation and management interface according to the input data, wherein the control console receives a network application data over the operation and management interface in response to the request and displays the network application data on the display module, wherein said console controller is programmed to launch a procedure for configuration, activation and confirmation for the consumer services, wherein the consumer services comprise cable television, pay-per-view services, video on demand services, or VoIP telephony services.

2. The device of claim 1, wherein the network application comprises at least one of:
an IP phone application;
a network multi-media application;
a network surveillance application; and
a network remote control application.

3. The device of claim 1, wherein the network application comprises an application logic and a network interface, wherein the application logic is coupled to the consumer network through the network interface, wherein the application logic comprises a network function component, wherein the network function component relates to an interaction between the application logic and the network interface, wherein the network function component comprises a remote server address of the remote server.

4. The device of claim 1 wherein said console controller is an ASIC, a programmable microprocessor, or a software application.

5. The device of claim 1 wherein said display module comprises an alphanumeric display panel, a graphic display or a speaker.

6. The device of claim 1 wherein said input module comprises a plurality of single or multi purpose buttons, keys, dials touch pads.

7. The device of claim 1 wherein said input module comprises a voice recognition module.

8. The device of claim 1 wherein said console controller is programmed for an automatic initial setup procedure for the network application.

9. The device of claim 1 wherein said console controller is programmed for a semiautomatic initial setup procedure wherein the console controller prompts the user at the display module for the user to confirm or enter network configuration settings.

10. The device of claim 1 wherein said console controller is programmed to prompt the user at the display module if the user would like to automatically connect to a remote technical support service for initial setup for the network application.

11. The device of claim 1 wherein said console controller is programmed to deliver advertisements or offers for the consumer services on said display module, wherein the user interacts or confirms purchases at said input module.

12. A method for operating and managing a network application on a network device, comprising:

obtaining input data from a user through an input module of a control console in the network device, the network device comprising the network application for providing consumer services from a remote server in a consumer network;

sending a request to the network application over an operating and management interface according to the input data;

receiving network application data over the operation and management interface in response to the request; and displaying the network application data on a display module of the control console, wherein said console controller is programmed to launch a procedure for configuration, activation and confirmation for the consumer services, wherein the consumer services comprise cable television, pay-per-view services, video on demand services, or VoIP telephony services.

13. The method of claim 12, wherein the network application comprises at least one of:
an IP phone application;
a network multi-media application;
a network surveillance application; and
a network remote control application.

14. The method of claim 12, wherein the network application comprises an application logic and a network interface, wherein the application logic is coupled to the consumer network through the network interface, wherein the application logic comprises a network function component, wherein the network function component relates to an interaction between the application logic and the network interface, wherein the network function component comprises a remote server address of the remote server.

15. The method of claim 12 wherein said console controller is programmed for an automatic initial setup procedure for the network application.

16. The method of claim 12 wherein said console controller is programmed for a semiautomatic initial setup procedure wherein the console controller prompts the user at the display module for the user to confirm or enter network configuration settings.

17. The method of claim 12 wherein said console controller is programmed to prompt the user at the display nodule if the user would like to automatically connect to a remote technical support service for initial setup for the network application.

18. The method of claim 12 wherein said console controller is programmed to deliver advertisements or offers for the consumer services on said display module, wherein the user interacts or confirms purchases at said input module.

* * * * *